US012574280B2

(12) United States Patent
Butt et al.

(10) Patent No.: US 12,574,280 B2
(45) Date of Patent: Mar. 10, 2026

(54) ITERATIVE INITIALIZATION OF MACHINE-LEARNING AGENT PARAMETERS IN WIRELESS COMMUNICATION NETWORK

(71) Applicant: NOKIA SOLUTIONS AND NETWORKS OY, Espoo (FI)

(72) Inventors: Muhammad Majid Butt, Naperville, IL (US); István Zsolt Kovács, Aalborg (DK); Jian Song, Palaiseau (FR); Klaus Ingemann Pedersen, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 57 days.

(21) Appl. No.: 18/729,676

(22) PCT Filed: Jan. 20, 2023

(86) PCT No.: PCT/EP2023/051303
§ 371 (c)(1),
(2) Date: Jul. 17, 2024

(87) PCT Pub. No.: WO2023/148012
PCT Pub. Date: Aug. 10, 2023

(65) Prior Publication Data
US 2025/0097093 A1 Mar. 20, 2025

(30) Foreign Application Priority Data
Feb. 2, 2022 (FI) ..................................... 20225086

(51) Int. Cl.
*G06F 15/16* (2006.01)
*G06N 20/00* (2019.01)
(Continued)

(52) U.S. Cl.
CPC ........... *H04L 41/042* (2013.01); *G06N 20/00* (2019.01); *H04L 41/16* (2013.01)

(58) Field of Classification Search
CPC ........ H04L 41/16; H04L 41/042; G06N 20/00
(Continued)

(56) References Cited

U.S. PATENT DOCUMENTS 10,039,016 B1 7/2018 Larish et al.
10,275,710 B1 * 4/2019 Teredesai ................ G06F 18/23
(Continued)

FOREIGN PATENT DOCUMENTS

CN 111 538 598 A 8/2020
WO 2020/115273 A1 6/2020
WO 2021/198742 A1 10/2021

OTHER PUBLICATIONS

International Search Report and Written Opinion dated Mar. 17, 2023 corresponding to International Patent Application No. PCT/EP2023/051303.
(Continued)

*Primary Examiner* — Moustafa M Meky
(74) *Attorney, Agent, or Firm* — SQUIRE PATTON BOGGS (US) LLP

(57) ABSTRACT
A machine-learning (ML) orchestrator entity provides distributed, flexible, and efficient parameter initialization and updating for ML agents can be installed on network nodes operating under similar radio conditions. The ML orchestrator entity instructs each of such network nodes to iteratively run the ML agent in a training mode. Each run yields a local set of parameters for the ML agent. After each run, the ML orchestrator entity collects and uses the local sets of parameters from two or more network nodes to derive a common set of parameters for the network nodes. The ML orchestrator further instructs each of the network nodes to
(Continued)

update its own local set of parameters based on the common set of parameters and use the updated local set of parameters in a subsequent run. The ML orchestrator entity repeats these steps until a termination criterion for the training mode is met.

24 Claims, 7 Drawing Sheets

(51) Int. Cl.
H04L 41/042 (2022.01)
H04L 41/16 (2022.01)

(58) Field of Classification Search
USPC .......................................................... 709/223
See application file for complete search history.

(56) References Cited

U.S. PATENT DOCUMENTS

| | | | | |
|---|---|---|---|---|
| 11,176,753 | B1 * | 11/2021 | Chakravarthi ....... | G06V 40/103 |
| 11,514,305 | B1 * | 11/2022 | Commons ............ | G06N 3/0455 |
| 11,651,032 | B2 * | 5/2023 | Jayaraman .............. | G06F 40/30 |
| | | | | 706/12 |
| 11,782,992 | B2 * | 10/2023 | Majumdar .............. | G06F 16/28 |
| | | | | 707/726 |
| 11,924,051 | B2 * | 3/2024 | Villasante Marcos ...................... | |
| | | | | H04L 41/16 |
| 11,948,022 | B2 * | 4/2024 | Faulhaber, Jr. ........ | G06N 20/00 |
| 11,968,257 | B2 * | 4/2024 | Barker, Jr. .............. | H04L 69/40 |
| 12,127,059 | B2 * | 10/2024 | Melodia ............... | H04B 17/336 |
| 12,149,587 | B2 * | 11/2024 | Barker, Jr. ............. | H04L 69/40 |
| 12,177,296 | B2 * | 12/2024 | Barker, Jr. ......... | H04L 67/1095 |
| 12,245,052 | B2 * | 3/2025 | Narasimha Swamy ..................... | |
| | | | | H04L 41/145 |
| 12,342,223 | B2 * | 6/2025 | Yeh ....................... | H04W 24/02 |
| 2019/0108447 | A1 * | 4/2019 | Kounavis ............... | G06V 40/28 |
| 2021/0343085 | A1 * | 11/2021 | Chakravarthi ......... | G06N 20/00 |
| 2022/0076165 | A1 * | 3/2022 | Minkin .................. | G06N 5/022 |
| 2022/0385543 | A1 * | 12/2022 | Villasante Marcos ....................... | |
| | | | | H04L 43/0858 |
| 2023/0362082 | A1 * | 11/2023 | Svennebring ......... | H04W 24/08 |

OTHER PUBLICATIONS

3GPP TR 22.874 V0.2.0 (Nov. 2020), Technical Report, 3rd Generation Partnership Project; Technical Specification Group Services and System Aspects; Study on traffic characteristics and performance requirements for AI/ML model transfer in 5GS (Release 18), S1-210214R1, Feb. 23, 2021, XP051980920.
3GPP TR 28.809 V17.0.0 (Mar. 2021), Technical Report, 3rd Generation Partnership Project; Technical Specification Group Services and System Aspects; Management and orchestration; Study on enhancement of Management Data Analytics (MDA) (Release 17), Apr. 6, 2021, XP052000543.

* cited by examiner

100

104

108

102

106

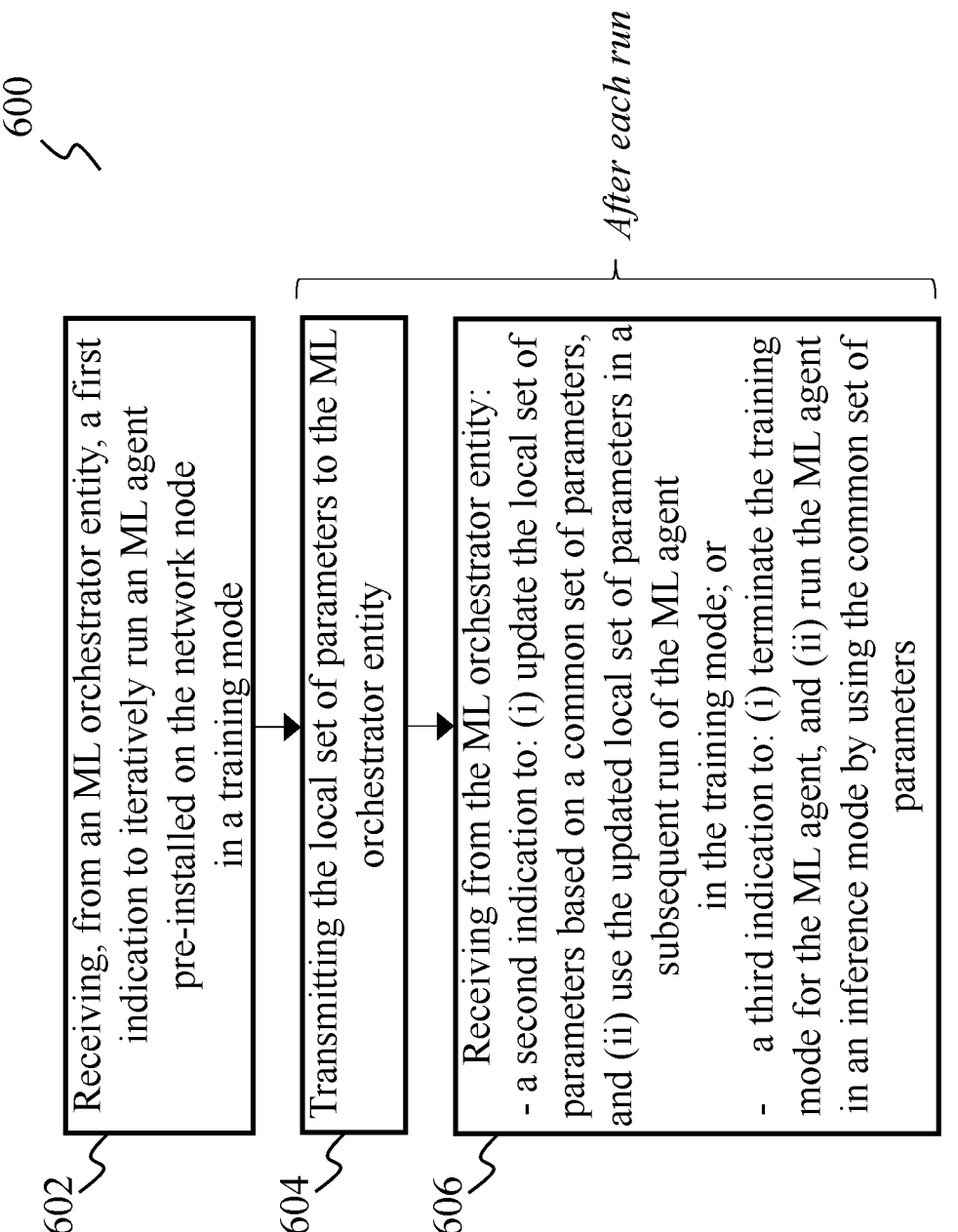

600

S602 — Receiving, from an ML orchestrator entity, a first indication to iteratively run an ML agent pre-installed on the network node in a training mode S604 — Transmitting the local set of parameters to the ML orchestrator entity S606 — Receiving from the ML orchestrator entity:
- a second indication to: (i) update the local set of parameters based on a common set of parameters, and (ii) use the updated local set of parameters in a subsequent run of the ML agent in the training mode; or
- a third indication to: (i) terminate the training mode for the ML agent, and (ii) run the ML agent in an inference mode by using the common set of parameters After each run

FIG. 6

ITERATIVE INITIALIZATION OF MACHINE-LEARNING AGENT PARAMETERS IN WIRELESS COMMUNICATION NETWORK

TECHNICAL FIELD

The present disclosure relates generally to the field of wireless communications, and particularly to techniques for iteratively initializing sets of parameters for machine-learning (ML) agents installed on network nodes in a wireless communication network.

BACKGROUND

There are multiple examples of ML algorithms for a wireless communication network (e.g., a Next-Generation Radio Access Network (NG-RAN)) which offer various Radio Resource Management (RRM) improvements. One of such ML algorithms is a Reinforcement Learning (RL) algorithm that, for example, provides a high-efficiency low-complexity mechanism for solving the problem of uplink transmit power control (TPC) parameter optimization for different user equipment (UE) clusters within a serving cell. However, such an RL-based solution typically relies on a set of input parameters which must be chosen carefully to obtain the best performance of the RL algorithm. In general, the prior art ML/RL-based solutions do not explain how to efficiently and iteratively initialize ML/RL algorithm parameters.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows parameters of ML agents used in a wireless communication network to be efficiently and iteratively initialized.

The objective above is achieved by the features of the independent claims in the appended claims. Further embodiments and examples are apparent from the dependent claims, the detailed description and the accompanying drawings.

According to a first aspect, an ML orchestrator entity in a wireless communication network is provided. The ML orchestrator entity comprises at least one processor and at least one memory. The at least one memory comprises a computer program code. The at least one memory and the computer program code are configured to, with the at least one processor, cause the ML orchestrator entity to operate at least as follows. At first, the ML orchestrator entity is caused to group a set of network nodes in the wireless communication network into at least one node cluster based on at least one radio condition of a set of cells served by the set of network nodes. Each network node from the set of network nodes has an ML agent installed thereon. The ML agent is configured to run based on a radio measurement in a training mode and an inference mode. Further, the ML orchestrator entity is caused to perform the following operations in respect of each node cluster from the at least one node cluster. The ML orchestrator entity transmits, to each network node of the node cluster, a first indication to iteratively run the ML agent in the training mode. Each run of the ML agent in the training mode yields a local set of parameters for the ML agent. After each run of the ML agents in the training mode, the ML orchestrator entity receives at least two local sets of parameters from at least two network nodes of the node cluster and uses the at least two local sets of parameters to obtain a common set of parameters. After each run of the ML agents in the training mode, the ML orchestrator entity checks, based on the common set of parameters, whether a termination criterion for the training mode is met. If the termination criterion for the training mode is not met, the ML orchestrator transmits, to each network node of the node cluster, a second indication to: (i) update the local set of parameters based on the common set of parameters, and (ii) use the updated local set of parameters in a subsequent run of the ML agent in the training mode. The second indication comprises the common set of parameters. By so doing, the ML orchestrator entity may iteratively process the local parameters of the ML agents installed on the network nodes in a distributed, flexible, and efficient manner. Furthermore, the common set of parameters obtained by the ML orchestrator entity after each subsequent iteration or run of the ML agents in the training mode for the same node cluster becomes more and more robust in the sense that it is less impacted by the radio condition(s) experienced by each specific network node of the node cluster, thereby potentially avoiding the parameter convergence towards unexpected trends. On top of that, the ML orchestrator entity thus configured may deal with any type of ML agents, including those based on deep RL and/or convolutional neural network (CNN)/deep NN (DNN).

In one example embodiment of the first aspect, the at least one memory and the computer program code are configured to, with the at least one processor, cause the ML orchestrator entity to receive each of the at least two local sets of parameters via an ML agent-specific signaling interface. By doing so, the ML orchestrator entity may be provided with the local set of parameters from a specific network node in a fast, reliable, and efficient manner.

In one example embodiment of the first aspect, the at least one memory and the computer program code are further configured to, with the at least one processor, cause the ML orchestrator entity to transmit, after each run of the ML agents in the training mode, a request for the local set of parameters to each of the at least two network nodes of the node cluster and, in response to the request, receive the at least two local sets of parameters. By so doing, the ML orchestrator entity itself may initiate the transmission or signaling of the local sets of parameters from the network nodes of the same node cluster.

In one example embodiment of the first aspect, the at least one memory and the computer program code are further configured to, with the at least one processor, cause the ML orchestrator entity, before transmitting the request, to randomly select the at least two network nodes among the node cluster. This example embodiment may be used to reduce computational complexity and signaling overhead in the network if there are too many network nodes (or, in other words, ML agents) used in each node cluster.

In one example embodiment of the first aspect, after each run of the ML agents in the training mode, the at least one memory and the computer program code are further configured to, with the at least one processor, cause the ML orchestrator entity to receive a request for the common set of parameters from each network node of the node cluster. In response to the request for the common set of parameters, the ML orchestrator is caused to transmit the second indication to each network node of the node cluster. In this example embodiment, the transmission or signaling of the common set of parameters (together with the second indication) may be initiated by each network node independently, which may be also useful in some applications.

In one example embodiment of the first aspect, the at least one memory and the computer program code are further configured to, with the at least one processor, cause the ML orchestrator entity to transmit, together with the second indication, a time instant from which the common set of parameters is to be used for updating the local set of parameters at each network node of the node cluster before the subsequent run of the ML agents is initiated. By doing so, the ML orchestrator entity may schedule when the network nodes of the same node cluster should start using the common set of parameters (e.g., the use of the common set of parameters at each network node of the same node cluster may be postponed for a certain period of time, if required).

In one example embodiment of the first aspect, if the termination criterion for the training mode is met, the at least one memory and the computer program code are further configured to, with the at least one processor, cause the ML orchestrator entity to transmit, to each network node of the node cluster, a third indication to: (i) terminate the training mode for the ML agent, and (ii) run the ML agent in the inference mode by using the common set of parameters (which is obtained after the last run of the ML agents) in the training mode. By using this third indication, the ML orchestrator entity may instruct the network nodes of the same node cluster to duly terminate the training mode and proceed to the inference mode by using the most efficient common set of parameters.

In one example embodiment of the first aspect, the at least one memory and the computer program code are further configured to, with the at least one processor, cause the ML orchestrator entity to transmit, together with the third indication, a time instant from which the common set of parameters is to be used in the inference mode of the ML agent at each network node of the node cluster. By doing so, the ML orchestrator entity may schedule when the network nodes of the same node cluster should start using the common set of parameters in the inference mode of the ML agent (e.g., the use of the common set of parameters at each network node of the same node cluster may be postponed for a certain period of time, if required).

In one example embodiment of the first aspect, the at least one memory and the computer program code are configured to, with the at least one processor, cause the ML orchestrator entity to obtain the common set of parameters by using at least one of a linear function, a non-linear function, and a Boolean function. By using these functions, the ML orchestrator entity may properly obtain the common set of parameters.

In one example embodiment of the first aspect, the ML agent is an RL agent configured to run in an exploration mode as the training mode and in an exploitation mode as the inference mode. Thus, the ML orchestrator entity may, for example, be efficiently used for solving the problem of RL-based uplink TPC parameter optimization for different UE clusters within a serving cell.

In one example embodiment of the first aspect, the RL agent is based on a Q-learning approach, and the local set of parameters from each of the at least two network nodes of the node cluster is presented as a local Q-table. In this example embodiment, the at least one memory and the computer program code are configured to, with the at least one processor, cause the ML orchestrator entity to obtain the common set of parameters as a common Q-table. By using Q-tables, it is possible to solve the problem of RL-based uplink TPC parameter optimization more efficiently.

In one example embodiment of the first aspect, the termination criterion for the training mode is defined as follows: a similarity metric calculated based on two or more common sets of parameters obtained after two or more consecutive runs of the ML agents of the at least two network nodes in the training mode is less than or equal to a threshold. By using such a termination criterion, it is possible to perform the parameter initialization in a more efficient manner.

According to a second aspect, a network node in a wireless communication network is provided. The network node comprises at least one processor and at least one memory. The at least one memory comprises a computer program code. The at least one memory and the computer program code are configured to, with the at least one processor, cause the network node to operate at least as follows. At first, the network node is caused to receive, from an ML orchestrator entity, a first indication to iteratively run an ML agent installed on the network node in a training mode. Each run of the ML agent in the training mode yields a local set of parameters for the ML agent. After each run of the ML agent in the training node, the network node is caused to transmit the local set of parameters to the ML orchestrator entity and to receive a second indication or a third indication from the ML orchestrator entity. The second indication causes the network node to: (i) update the local set of parameters based on a common set of parameters, and (ii) use the updated local set of parameters in a subsequent run of the ML agent in the training mode. The third indication causes the network node to: (i) terminate the training mode for the ML agent, and (ii) run the ML agent in an inference mode by using the common set of parameters. Each of the second indication and the third indication comprises the common set of parameters. The common set of parameters is obtained based on the local set of parameters of the network node and at least one other local set of parameters of at least one other network node. By so doing, the local parameters of the ML agent installed on the network node may be iteratively processed by the ML orchestrator entity in a flexible and efficient manner. Furthermore, after each subsequent iteration or run of the ML agent in the training mode, the network node may be provided with a more and more robust common set of parameters in the sense that it is less impacted by the radio condition(s) experienced by the network node itself. This allows potentially avoiding the parameter convergence towards unexpected trends. On top of that, the network node thus configured may deal with any type of ML agents, including those based on deep RL and/or CNN/DNN.

In one example embodiment of the second aspect, the at least one memory and the computer program code are configured to, with the at least one processor, cause the network node to transmit the local set of parameters via an ML agent-specific signaling interface. By doing so, the network node may transmit its local set of parameters to the ML orchestrator entity in a fast, reliable, and efficient manner.

In one example embodiment of the second aspect, the at least one memory and the computer program code are further configured to, with the at least one processor, cause the network node to receive, after each run of the ML agent in the training mode, a request for the local set of parameters from the ML orchestrator entity. In response to the request, the network node is caused to transmit the local set of parameters to the ML orchestrator entity. In this example embodiment, the ML orchestrator entity itself may initiate the transmission or signaling of the local set of parameters from the network node.

In one example embodiment of the second aspect, the at least one memory and the computer program code are further configured to, with the at least one processor, cause the ML orchestrator entity to transmit, after each run of the ML agent in the training mode, a request for the common set of parameters to the ML orchestrator entity and, in response to the request, receive the second indication or the third indication from the ML orchestrator entity. By so doing, the network node itself may initiate the transmission of the second or third indication from the ML orchestrator entity.

In one example embodiment of the second aspect, the at least one memory and the computer program code are further configured to, with the at least one processor, cause the network node to receive, together with the second indication, a time instant from which the common set of parameters is to be used for updating the local set of parameters at the network node before the subsequent run of the ML agent is initiated. By indicating the time instant, the ML orchestrator entity may schedule when the network node should start using the common set of parameters (e.g., the use of the common set of parameters may be postponed for a certain period of time, if required).

In one example embodiment of the second aspect, the at least one memory and the computer program code are further configured to, with the at least one processor, cause the network node to receive, together with the third indication, a time instant from which the common set of parameters is to be used in the inference mode of the ML agent at the network node. By indicating the time instant, the ML orchestrator entity may schedule when the network node should start using the common set of parameters in the inference mode (e.g., the use of the common set of parameters may be postponed for a certain period of time, if required).

In one example embodiment of the second aspect, the ML agent is an RL agent configured to run in an exploration mode as the training mode and in an exploitation mode as the inference mode. Thus, the network node may, for example, be efficiently used for solving the problem of RL-based uplink TPC parameter optimization for different UE clusters within a serving cell.

In one example embodiment of the second aspect, the RL agent is based on a Q-learning approach, and the at least one memory and the computer program code are configured to, with the at least one processor, cause the network node to present the local set of parameters as a local Q-table. In this example embodiment, the common set of parameters is presented as a common Q-table. By using Q-tables, it is possible to solve the problem of RL-based uplink TPC parameter optimization more efficiently.

According to a third aspect, a method for operating an ML orchestrator entity in a wireless communication network is provided. The method starts with the step of grouping a set of network nodes in the wireless communication network into at least one node cluster based on at least one radio condition of a set of cells served by the set of network nodes. Each network node from the set of network nodes has an ML agent installed thereon. The ML agent is configured to run based on a radio measurement in a training mode and an inference mode. Further, the method proceeds to the following steps which are to be performed independently for each node cluster from the at least one node cluster. The ML orchestrator entity transmits, to each network node of the node cluster, a first indication to iteratively run the ML agent in the training mode. Each run of the ML agent in the training mode yields a local set of parameters for the ML agent. After each run of the ML agents in the training mode, the ML orchestrator entity receives at least two local sets of parameters from at least two network nodes of the node cluster and uses the at least two local sets of parameters to obtain a common set of parameters. After each run of the ML agents in the training mode, the ML orchestrator entity checks, based on the common set of parameters obtained after that run, whether a termination criterion for the training mode is met. If the termination criterion for the training mode is not met, the ML orchestrator transmits, to each network node of the node cluster, a second indication to: (i) update the local set of parameters based on the common set of parameters, and (ii) use the updated local set of parameters in a subsequent run of the ML agent in the training mode. The second indication comprises the common set of parameters. By so doing, the ML orchestrator entity may iteratively process the local parameters of the ML agents installed on the network nodes in a distributed, flexible, and efficient manner. Furthermore, the common set of parameters obtained by the ML orchestrator entity after each subsequent iteration or run of the ML agents in the training mode for the same node cluster becomes more and more robust in the sense that it is less impacted by the radio condition(s) experienced by each specific network node of the node cluster, thereby potentially avoiding the parameter convergence towards unexpected trends. On top of that, the ML orchestrator entity thus configured may deal with any type of ML agents, including those based on deep RL and/or CNN/DNN.

According to a fourth aspect, a method for operating a network node in a wireless communication network is provided. The method starts with the step of receiving, from an ML orchestrator entity, a first indication to iteratively run an ML agent installed on the network node in a training mode. Each run of the ML agent in the training mode yields a local set of parameters for the ML agent. Then, after each run of the ML agent in the training mode, the method proceeds to the steps of transmitting the local set of parameters to the ML orchestrator entity and receiving a second indication or a third indication from the ML orchestrator entity. The second indication causes the network node to: (i) update the local set of parameters based on a common set of parameters, and (ii) use the updated local set of parameters in a subsequent run of the ML agent in the training mode. The third indication causes the network node to: (i) terminate the training mode for the ML agent, and (ii) run the ML agent in an inference mode by using the common set of parameters. Each of the second indication and the third indication comprises the common set of parameters. The common set of parameters is obtained based on the local set of parameters of the network node and at least one other local set of parameters of at least one other network node. By so doing, the local parameters of the ML agent installed on the network node may be iteratively processed by the ML orchestrator entity in a flexible and efficient manner. Furthermore, after each subsequent iteration or run of the ML agent in the training mode, the network node may be provided with a more and more robust common set of parameters in the sense that it is less impacted by the radio condition(s) experienced by the network node itself. This allows potentially avoiding the parameter convergence towards unexpected trends. On top of that, the network node thus configured may deal with any type of ML agents, including those based on deep RL and/or CNN/DNN.

According to a fifth aspect, a computer program product is provided. The computer program product comprises a computer-readable storage medium that stores a computer code. Being executed by at least one processor, the computer code causes the at least one processor to perform the method according to the third aspect. By using such a computer program product, it is possible to simplify the implementation of the method according to the third aspect in any network entity, like the ML orchestrator entity according to the first aspect.

According to a sixth aspect, a computer program product is provided. The computer program product comprises a computer-readable storage medium that stores a computer code. Being executed by at least one processor, the computer code causes the at least one processor to perform the method according to the fourth aspect. By using such a computer program product, it is possible to simplify the implementation of the method according to the fourth aspect in any network node, like the network node according to the second aspect.

According to a seventh aspect, an ML orchestrator entity in a wireless communication network is provided. The ML orchestrator entity comprises a means for grouping a set of network nodes in the wireless communication network into at least one node cluster based on at least one radio condition of a set of cells served by the set of network nodes. Each network node from the set of network nodes has an ML agent installed thereon. The ML agent is configured to run based on a radio measurement in a training mode and an inference mode. The ML orchestrator entity further comprises one or more means for performing the following steps for each of the at least one node cluster:

transmitting, to each network node of the node cluster, a first indication to iteratively run the ML agent in the training mode, wherein each run of the ML agent in the training mode yields a local set of parameters for the ML agent; and after each run of the ML agents in the training mode:

receiving at least two local sets of parameters from at least two network nodes of the node cluster;

based on the at least two local sets of parameters, obtaining a common set of parameters;

based on the common set of parameters, checking whether a termination criterion for the training mode is met; and if the termination criterion for the training mode is not met, transmitting, to each network node of the node cluster, a second indication to: (i) update the local set of parameters based on the common set of parameters, and (ii) use the updated local set of parameters in a subsequent run of the ML agent in the training mode, wherein the second indication comprises the common set of parameters.

By so doing, the ML orchestrator entity may iteratively process the parameters of the ML agents installed on the network nodes in a distributed, flexible, and efficient manner. Furthermore, the common set of parameters obtained by the ML orchestrator entity after each subsequent iteration or run of the ML agents in the training mode for the same node cluster becomes more and more robust in the sense that it is less impacted by the radio condition(s) experienced by each specific network node of the node cluster, thereby potentially avoiding the parameter convergence towards unexpected trends. On top of that, the ML orchestrator entity thus configured may deal with any type of ML agents, including those based on deep RL and/or CNN/DNN.

According to an eighth aspect, a network node in a wireless communication network is provided. The network node comprises a means for receiving, from an ML orchestrator entity, a first indication to iteratively run an ML agent installed on the network node in a training mode. Each run of the ML agent in the training mode yields a local set of parameters for the ML agent. The network node further comprises one or more means for performing the following steps after each run of the ML agent in the training mode:

transmitting the local set of parameters to the ML orchestrator entity; and receiving, from the ML orchestrator entity, a second indication or a third indication.

In case of the second indication, the network node further comprises a means for: (i) updating the local set of parameters based on a common set of parameters, and (ii) using the updated local set of parameters in a subsequent run of the ML agent in the training mode. In case of the third indication, the network node further comprises a means for: (i) terminating the training mode for the ML agent, and (ii) running the ML agent in an inference mode by using the common set of parameters. Each of the second indication and the third indication comprises the common set of parameters. The common set of parameters is obtained based on the local set of parameters of the network node and at least one other local set of parameters of at least one other network node. By so doing, the local parameters of the ML agent installed on the network node may be iteratively processed by the ML orchestrator entity in a flexible and efficient manner. Furthermore, after each subsequent iteration or run of the ML agent in the training mode, the network node may be provided with a more and more robust common set of parameters in the sense that it is less impacted by the radio condition(s) experienced by the network node itself. This allows potentially avoiding the parameter convergence towards unexpected trends. On top of that, the network node thus configured may deal with any type of ML agents, including those based on deep RL and/or CNN/DNN.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which:

FIG. 6 shows a flowchart of a method for operating the network node shown in FIG. 5 in accordance with one example embodiment.

DETAILED DESCRIPTION

Figure 1:
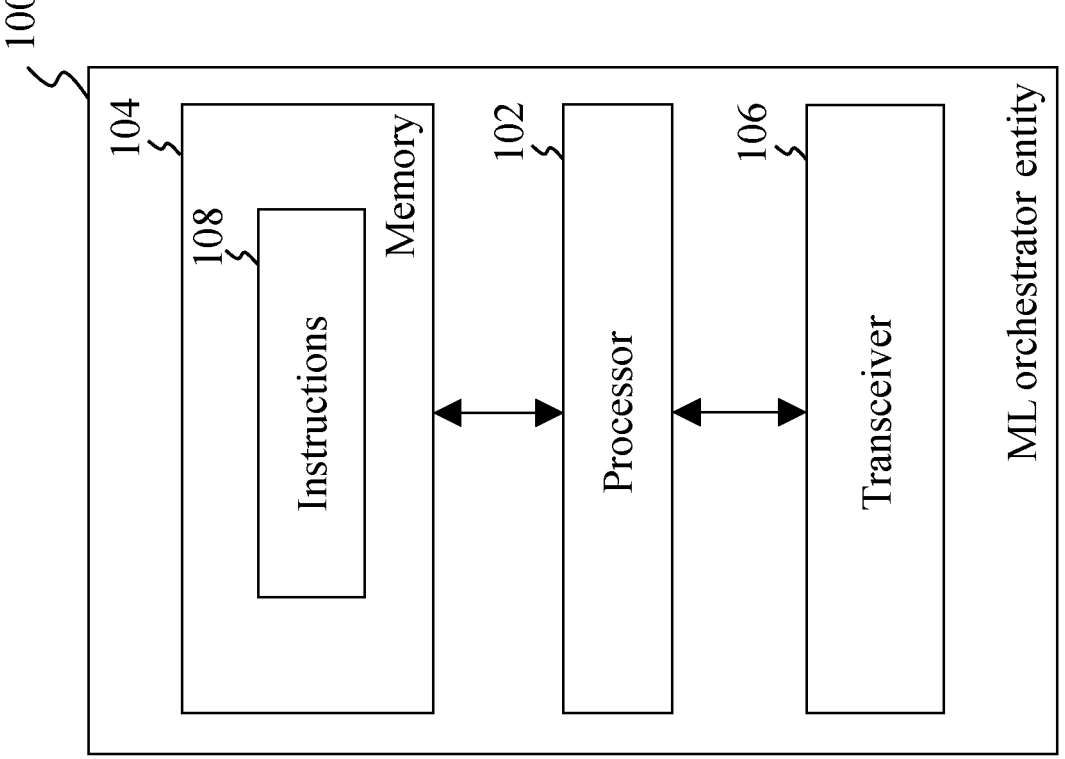
FIG. 1 shows a block diagram of a machine-learning (ML) orchestrator entity in accordance with one example embodiment.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

According to the example embodiments disclosed herein, a User Equipment (UE) may refer to an electronic computing device that is configured to perform wireless communications. The UE may be implemented as a mobile station, a mobile terminal, a mobile subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some embodiments, the UE may refer to at least two collocated and inter-connected UEs thus defined.

As used in the example embodiments disclosed herein, a network node may refer to a fixed point of communication for a UE in a particular wireless communication network. More specifically, the network node is used to connect the UE to a Data Network (DN) through a Core Network (CN) and may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro node, the network node serving the microcell may be referred to as a micro node, and so on.

According to the example embodiments disclosed herein, a machine-learning (ML) orchestrator entity or, in other words, an ML coordinator (MLC) may refer to an apparatus configured to manage the operation of ML agents installed on different network nodes in a centralized and automatic manner. More specifically, the ML orchestrator entity discussed herein may be efficiently used to initialize and update local parameters of each of the ML agents. The ML orchestrator entity may be implemented as a gNB-Control Unit (gNB-CU) in case of a gNB split architecture (in this example, one or more network nodes may be implemented as one or more gNB-Distributed Units (gNB-DUs)), a Radio Access Network (RAN) Intelligent Controller (RIC), or any CN function (e.g., a Network Data Analytics Function (NWDAF), an Operations, Administration, and Maintenance Function (OAMF), etc.).

As used in the example embodiments disclosed herein, an ML agent may refer to a system that uses a ML-based algorithm to perform one or more network tasks, such, for example, as Radio Resource Management (RRM) (e.g., uplink TPC parameter optimization), UE detection and location, etc. The ML agent may be implemented as a software component installed on a network node in a wireless communication network for the purpose of solving the network tasks.

According to the example embodiments disclosed herein, a wireless communication network, in which an ML orchestrator entity manages the operation of ML agents of network nodes, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

The operational efficiency and the overall cost of operation of a wireless communication network may be reduced by means of network function automation and rational RRM. All of this may be achieved by using ML-based control algorithms in network nodes. The ML-based control algorithms may allow one to simplify and automate complex network tasks, resulting in a more efficient network operation and improved quality of wireless communications.

One critical aspect identified for the ML-based (especially, RL-based) control algorithms is their initialization during the so called 'warm-up' period (i.e., during a training mode, also known as a learning phase). However, the existing ML-based control algorithms applied in network nodes do not give details on how to provide the most efficient parameter initialization (as well as their updating) of the ML-based control algorithms. It is therefore desirable to make such ML-based control algorithms:

(i) robust to dynamically changing radio conditions usually observed in cells of interest—such that they allow for nearly real-time adaptation to new radio conditions, certainly without human intervention;

(ii) capable of providing the same initialization parameters to ML agents installed on network nodes which serve cells with similar radio conditions; and (iii) easy to execute and reproduce off-line in an ML orchestrator entity based on previously collected data—such that periodic sanity checks may be performed without compromising the network performance.

The example embodiments disclosed herein provide a technical solution that allows mitigating or even eliminating the above-sounded drawbacks peculiar to the prior art. In particular, the technical solution disclosed herein relates to an ML orchestrator entity that provides distributed, flexible, and efficient parameter initialization and, if required, updating for ML agents installed on network nodes operating under similar radio conditions. For this end, the ML orchestrator entity instructs each of such network nodes to iteratively run the ML agent in a training mode, which results in generating a local set of parameters. Then, after each run of the ML agents in the training mode, the ML orchestrator entity collects and uses the local sets of parameters from two or more network nodes to derive a common set of parameters for the network nodes. The ML orchestrator further instructs each of the network nodes to update its own local set of parameters based on the common set of parameters and use the updated local set of parameters in a subsequent run of the ML agent in the training mode. The ML orchestrator entity repeats these steps until a termination criterion for the training mode is met. The proposed configuration of the ML orchestrator entity corresponds to all requirements (i)-(iii) mentioned above.

FIG. 1 shows a block diagram of an ML orchestrator entity 100 in accordance with one example embodiment. The ML orchestrator entity 100 is intended to communicate with one or more network nodes in any of the above-described wireless communication networks. As shown in FIG. 1, the ML orchestrator entity 100 comprises a processor 102, a memory 104, and a transceiver 106. The memory 104 stores processor-executable instructions 108 which, when executed by the processor 102, cause the processor 102 to perform the aspects of the present disclosure, as will be described below in more detail. It should be noted that the number, arrangement, and interconnection of the constructive elements constituting the ML orchestrator entity 100, which are shown in FIG. 1, are not intended to be any limitation of the present disclosure, but merely used to provide a general idea of how the constructive elements may be implemented within the ML orchestrator entity 100. For example, the processor 102 may be replaced with several processors, as well as the memory 104 may be replaced with several removable and/or fixed storage devices, depending on particular applications. Furthermore, in some embodiments, the transceiver 106 may be implemented as two individual devices, with one for a receiving operation and another for a transmitting operation. Irrespective of its implementation, the transceiver 106 is intended to be capable of performing different operations required to perform the data reception and transmission, such as, for example, as signal modulation/demodulation, encoding/decoding, etc. In other embodiments, the transceiver 106 may be part of the processor 102 itself.

The processor 102 may be implemented as a CPU, general-purpose processor, single-purpose processor, micro-controller, microprocessor, application specific integrated circuit (ASIC), field programmable gate array (FPGA), digital signal processor (DSP), complex programmable logic device, etc. It should be also noted that the processor 102 may be implemented as any combination of one or more of the aforesaid. As an example, the processor 102 may be a combination of two or more microprocessors.

The memory 104 may be implemented as a classical nonvolatile or volatile memory used in the modern electronic computing machines. As an example, the nonvolatile memory may include Read-Only Memory (ROM), ferro-electric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 108 stored in the memory 104 may be configured as a computer-executable program code which causes the processor 102 to perform the aspects of the present disclosure. The computer-executable program code for carrying out operations or steps for the aspects of the present disclosure may be written in any combination of one or more programming languages, such as Java, C++, or the like. In some examples, the computer-executable program code may be in the form of a high-level language or in a pre-compiled form and be generated by an interpreter (also pre-stored in the memory 104) on the fly.

Figure 2:
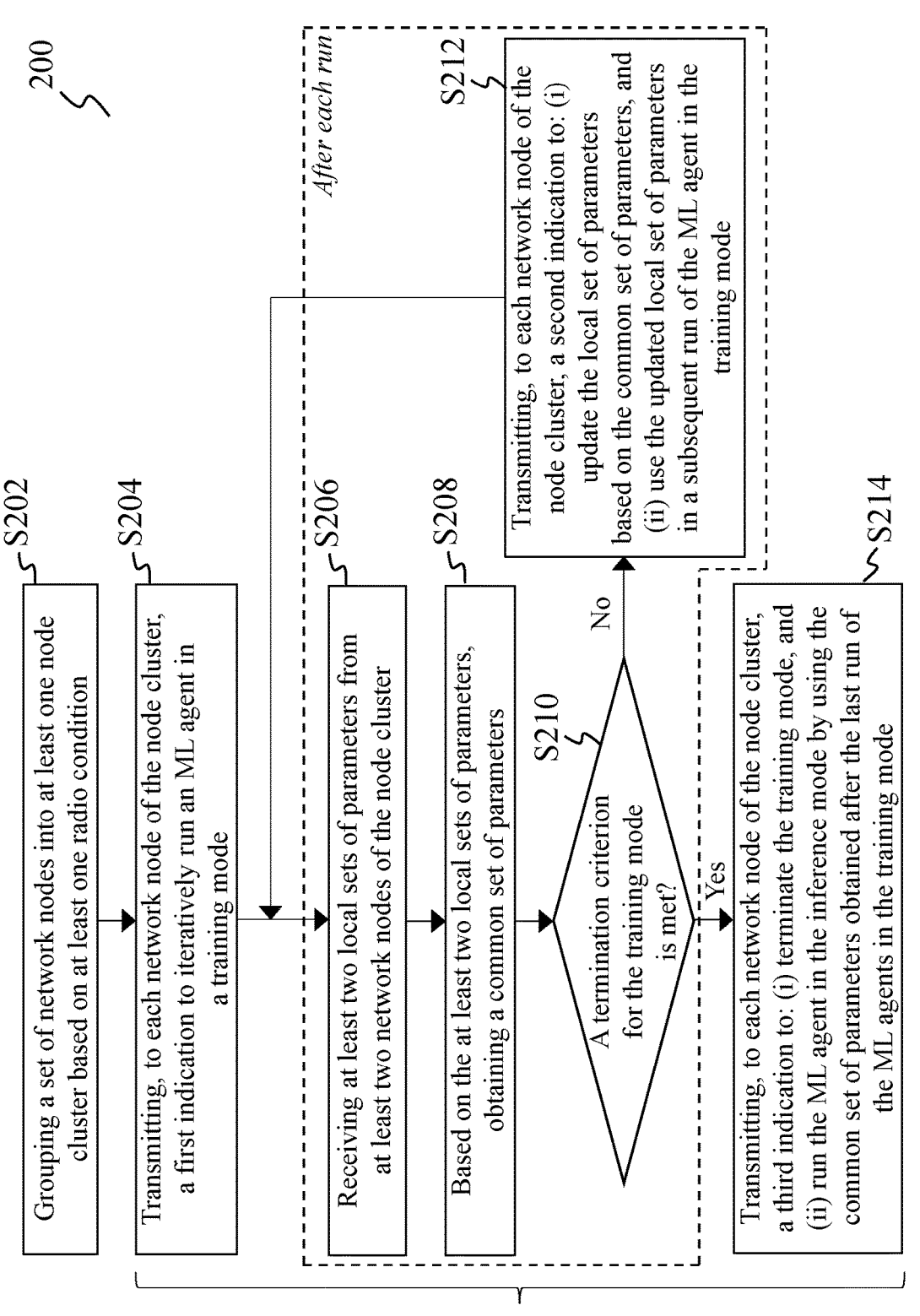
FIG. 2 shows a flowchart of a method for operating the ML orchestrator entity shown in FIG. 1 in accordance with one example embodiment.

FIG. 2 shows a flowchart of a method 200 for operating the ML orchestrator entity 100 in accordance with one example embodiment.

The method 200 starts with a step S202, in which the processor 102 groups a set of network nodes in the wireless communication network into one or more node clusters based on one or more radio conditions of a set of cells served by the set of network nodes. For example, the node cluster(s) may be constituted by the network nodes serving the cells which are located within the same geographical area and/or in which the same type of UE traffic is observed. In general, each node cluster may comprise the network nodes corresponding to similar radio conditions of the served cells. It is also assumed that each network node from the set of network nodes has an ML agent installed thereon in advance. Such an ML agent should be configured to run in a training mode and an inference mode based on input data that may be represented by any network data usually used in the existing wireless communication networks. One non-restrictive example of such input data may include different radio measurements (e.g., UE Reference Signal Received Power (RSRP) measurements, UE transmission power measurements, etc.).

Once the node cluster(s) is(are) obtained, the method 200 proceeds to steps S204-S214 which are performed by the processor 102 independently for each node cluster. It should be noted that, in case of two or more node clusters obtained in the step S202, the two or more node clusters may be subjected to the steps S204-S214 in parallel or in sequence, depending on particular applications and/or processor capabilities. Looking ahead, it should be also noted that the dashed contour enclosing the steps S206-S212 implies that the steps S206-S212 are repeated after each run (or iteration) of the ML agents in the training mode until a termination criterion is met, as will be discussed later in more detail.

In the step S204, the processor 102 transmits (e.g., via the transceiver 106), to each network node of the node cluster, a first indication to iteratively (or periodically) run the ML agent in the training mode. Each run of the ML agent in the training mode yields a local set of parameters for the ML agent. The first indication may be transmitted by using an ML agent-specific signaling interface. Such an indication may also comprise training mode characteristics which may be exemplified by at least one of: a learning rate (periodicity), dedicated radio resources to be used during the training mode, and a training duration within which each network node should periodically run the ML agent in the training mode. The training mode characteristics may be set to be the same for each network node of the node cluster. The training mode execution results in the set of parameters that is indicative of an ML agent performance (e.g., any type of Key Performance Indicator (KPI) commonly used in the art) in each network node of the node cluster. In an alternative example embodiment, the processor 102 may poll each network node of the node cluster to determine whether there is a local set of parameters available in the network node after each run of the ML agents in the training mode; if so, the processor 102 may request such network nodes to provide their (at least two) local sets of parameters.

In the step S206, after each run of the ML agents in the training mode, the processor 102 receives (e.g., via the transceiver 106) the local sets of parameters from two or more network nodes of the node cluster. Each local set of parameters may be again received over the ML agent-specific signaling interface. In one example embodiment, each of said two or more network nodes may initiate the transmission or signaling of its local set of parameters by itself (e.g., once the local set of parameters is generated). In another example embodiment, the transmission or signaling of the local sets of parameters from said two or more network nodes may be initiated by the ML orchestrator entity 100 (e.g., the processor 102 may transmit a request for the local set of parameters to each of said two or more network nodes and, in response, receive the local sets of parameters therefrom; alternatively, the transmission or signaling of the local set of parameters from each of said two or more network nodes may be initiated in response to a certain trigger event or depending on subscriptions and protocols applied for these network nodes).

In the step S208, the processor 102 obtains a common set of parameters based on the local sets of parameters received from the network nodes involved in the step S206. In some example embodiments, the common set of parameters may be generated by using at least one of a linear function, a non-linear function, and a Boolean function. Some non-restrictive examples of such functions include an averaging function, a weighted sum function, a minimum function (i.e., function MIN( )), and a maximum function (i.e., function MAX( )). For example, if the processor 102 receives three local sets of parameters from one node cluster in the step S206, and assuming that each of the three local sets of parameters is presented as $S_i=(a_i, b_i, c_i)$, where $i=1,2,3$, the processor 102 may obtain the common set of parameters for the node cluster by sequentially computing an average over each of parameters $a_i$, $b_i$, $c_i$ for the three local sets of parameters, thereby generating the following common set of parameters: $S^*=(a_{average}, b_{average}, c_{average})$. Alternatively, the processor 102 may find the lowest or highest value of each of parameters $a_i$, $b_i$, $c_i$ among the three local sets of parameters by using the function MIN( ) or MAX( ), respectively, thereby obtaining the following common set of parameters: $S^*=(a_{min}, b_{min}, c_{min})$ or $S^*=(a_{max}, b_{max}, c_{max})$. At the same time, the processor 102 may use any combination of the above-described and other mathematical functions to obtain the common set of parameters (e.g., the processor 102 may use the combination of the functions MIN( ) and MAX( ) and the averaging function such that the common set of parameters is as follows: $S^*=(a_{min}, b_{max}, c_{average})$).

In the step S210, the processor 102 uses the common set of parameters obtained in the step S208 to check whether the termination criterion for the training mode is met. In one example embodiment, the step S210 may consist in checking whether a similarity metric calculated based on two or more common sets of parameters obtained after two or more consecutive runs of the ML agents of said two or more network nodes in the training mode is less than a threshold. For example, the termination criterion may be met when similar parameters of the two or more common sets of parameters do not change much (e.g., relative changes are less than the threshold). Such a termination criterion may be defined as follows: Mean(Common_set(t)−Common_set(t−1))≤ε, where Mean( ) is the function that calculates a mean/average of a given list of numbers/values, Common_set(t) and Common_set(t−1) are the common sets of parameters obtained after the two consecutive runs initiated at times t and t−1, respectively, and ε is the threshold. The termination criterion may also be defined differently, for example, as follows: Square(Mean(Common_set(t)−Common_set(t−1)))≤ε, or Mean(Square(Common_set(t)−Common_set(t−1)))≤ε, where Square( ) is the function that returns the square of a number. From these possible termination criteria, it follows that there should be at least two consecutive runs completed before the termination criterion needs to be checked. If ε is small, the parameter initialization will be more stable, but their convergence will take more time. Thus, the threshold should be selected based on these considerations, i.e., such that there is a trade-off between the stability of the method 200 and the time costs required by the method 200. It should be also noted that the present disclosure is not limited to the above-given example of the termination criterion—in other embodiments, the termination criterion may be defined such that it may be used, for example, immediately after one run of the ML agents in the training mode (e.g., the processor 102 may check how much the common set of parameters obtained in the step S208 differs from the local sets of parameters received in the step S206, and if this difference is within a predefined variation range, then the termination criterion may be considered met).

If the processor 102 finds in the step S210 that the termination criterion is not met (e.g., Mean(Common_set(t)>ε), then the method 200 proceeds to the step S212. In the step S212, the processor 102 transmits (e.g., via the transceiver 106), to each network node of the node cluster, a second indication to: (i) update the local set of parameters based on the common set of parameters obtained in the step S208, and (ii) use the updated local set of parameters in a subsequent run of the ML agent in the training mode. The second indication comprises the common set of parameters. In other words, each network node of the node cluster receives the common set of parameters and processes its local set of parameters with the common one to create its unique local set of parameters to be used for the subsequent run of the ML agent in the training mode. After that, the steps S206-S212 are repeated for the subsequent run of the ML agents in the training mode, and if there is still "No" in the step S210 (i.e., the termination criterion is not met again), then each network node should update its set of parameters again, as described above. As the number of such runs or iterations increases, the variance between the local sets of parameters and the common set of parameters decreases. At the end of this iterative process, when the termination criterion is met, the common set of parameters obtained after the last run (i.e., the run after which there is "Yes" in the step S210) is representative of radio and geographical conditions of all cells observed by the network nodes of the node cluster.

If the processor 102 finds in the step S210 that the termination criterion is met, then the method 200 may proceed to the step S214. In the step S214, the processor 102 transmits (e.g., via the transceiver 106), to each network node of the node cluster, a third indication to: (i) terminate the training mode for the ML agent, and (ii) run the ML agent in the inference mode by using the common set of parameters (which is obtained after the last run of the ML agents) in the training mode. The inference mode may be used to solve a certain network task (e.g., uplink TPC parameter optimization).

In one example embodiment, the processor 102 additionally transmits, together with the second indication in the step S212, a time instant from which the common set of parameters is to be used for updating the local set of parameters at each network node of the node cluster before the subsequent run of the ML agents is initiated. The same may be also done in the step S214: the processor 102 may transmit, together with the third indication, a time instant from which the common set of parameters is to be used in the inference mode of the ML agent at each network node of the node cluster. The time instant may be indicated, for example, by using a System Frame Number (SFN) or in accordance with the Coordinated Universal Time (UTC) standard.

In one example embodiment, the ML agent installed on each network node of the node cluster of interest may be an RL agent that is configured to run in an exploration mode as the training mode and in an exploitation mode as the inference mode. Furthermore, such an RL agent may use a well-known Q-learning approach, for which reason the local set of parameters generated by each of the network nodes may be presented as a local Q-table. The Q-table is a well-known type of a lookup table which comprises values each represented by a combination of a state and an action taken by the RL agent in the state, i.e., Q(state, action). These local Q-tables are obtained by using a state-action value function which is also well-known in the art and therefore not described herein in detail. The local Q-table may serve as an RL agent performance metric which reflects the degree/extent of achieved exploration in each network node. The local Q-table may optionally include the actual achieved values Q(state, action) and/or other metrics, such as a number of visits for each value Q(state, action), an averaged reward value after exploration, etc. Moreover, if required, the Q-table values may be normalized using a pre-configured rule (e.g., the normalization may be based on maximum and minimum expected cell throughputs in a given cell (RL agent) during a predefined time period). In this example embodiment, the common set of parameters may be also generated in the step S208 as a common Q*-table which may be formatted in the same manner as the local Q-tables from the network nodes. It should be noted that the common Q*-table may be generated by using the same functions as the ones discussed above with reference to the common set S* of parameters.

In one example embodiment, if it is the ML orchestrator entity 100 (i.e., the processor 102) which initiates the transmission or signaling of the local sets of parameters after each run of the ML agent in the training mode, the network nodes involved in the step S206 may be selected by the processor 102 randomly (e.g., by using a random number generator, given that each network node of the node cluster is provided with a certain numerical identifier (ID)).

Figure 3:
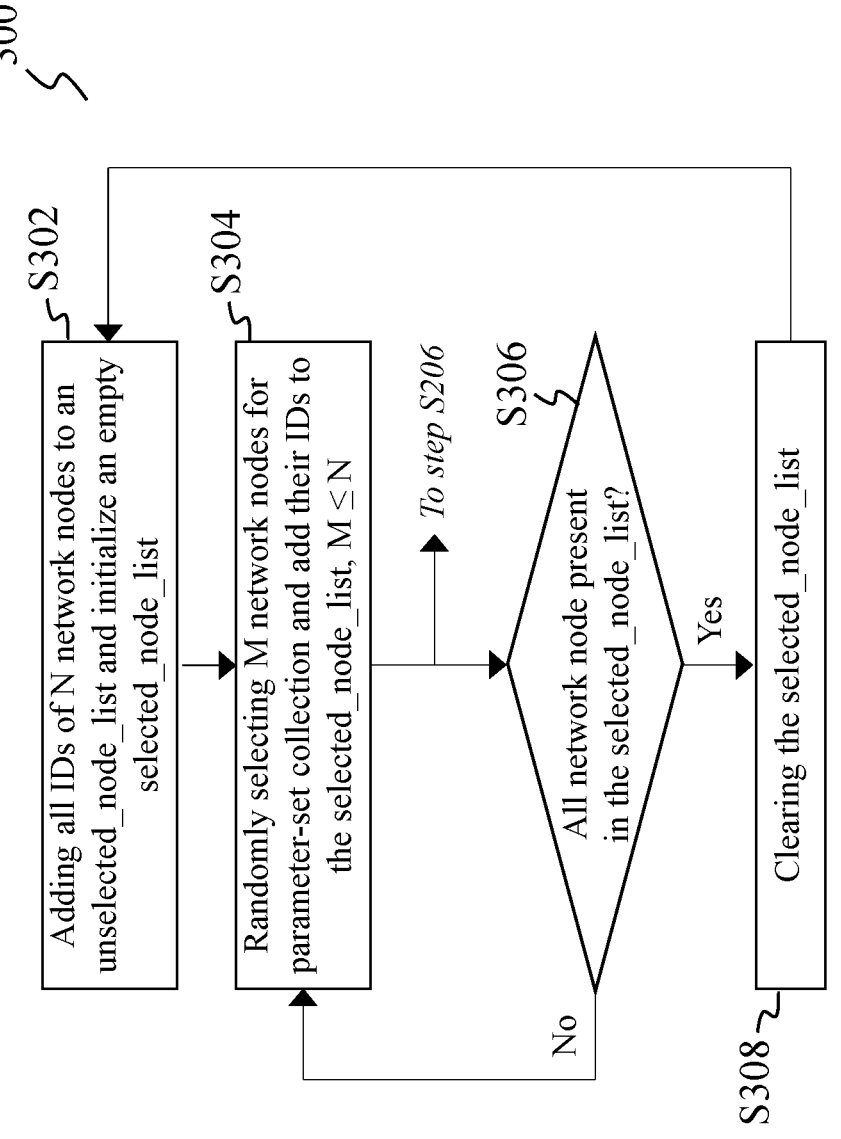
FIG. 3 shows a flowchart of a node selection algorithm in accordance with one example embodiment.

FIG. 3 shows a flowchart of a node selection algorithm 300 in accordance with one example embodiment. The algorithm 300 is intended to be used when the ML orchestrator entity 100 initiates itself the transmission or signaling of the local sets of parameters (for the purpose of receiving or collecting them in the step S206 of the method 200) after each run of the ML agents in the training mode. Let us assume that there are N network nodes in the node cluster obtained in the step S202 of the method 200. The algorithm 300 starts with a step S302, in which the processor 102 adds all IDs of the N network nodes to an unselected_node_list and initialize an empty selected_node_list. Further, the algorithm 300 proceeds to a step S304, in which the processor 102 randomly selects M≤N network nodes from the unselected_node_list and output their IDs to the step S206 of the method 200 (i.e., by using these IDs, the processor 102 may request the M network nodes to transmit their local sets of parameters and receive these local sets of parameters). After that, the algorithm 300 goes on to a step S306, in which the processor 102 adds the selected M network nodes to the selected_node_list, thereby reducing the size of the unselected_node_list by M, and checks whether the selected_node_list is full. If the size of the unselected_node_list is less than M, the processor 102 selects all the remaining network nodes for obtaining the common set of parameters (e.g., the common Q-table) after recent iteration or run in the step S208 of the method 200. If the size of the selected_node_list is equal to N, the processor 102 resets or clears the selected_node_list and move the IDs of all the network nodes to the unselected_node_list in a next step S308. After each iteration or run of the ML agents in the training mode, the processor 102 repeats the steps S302-S308 until the termination condition is met.

Figure 4:
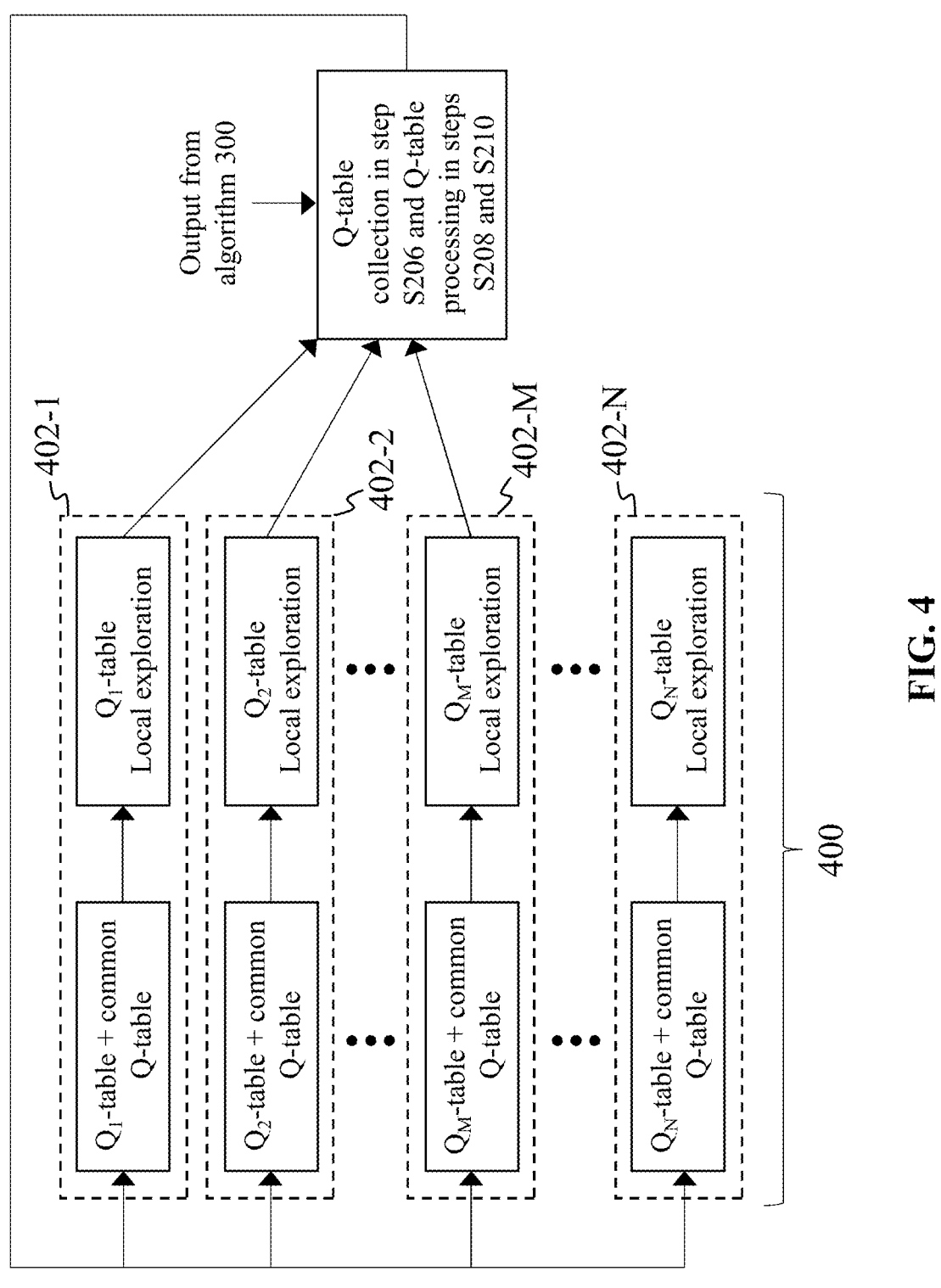
FIG. 4 explains how a common set of parameters obtained in the method shown in FIG. 2 may be used for updating local sets of parameters of ML agents in a possible ML-based scenario.

FIG. 4 explains how the common set of parameters obtained in the step S208 of the method 200 may be used for updating the local sets of parameters of ML agents in a possible ML-based scenario. In this ML-based scenario, it is assumed that each ML agent is implemented as an RL agent using the Q-learning approach, whereupon each local set of parameters and the common set of parameters are presented as corresponding local Q-tables. It is also assumed that the processor 102 obtains a single node cluster 400 comprising N network nodes 402-1, 402-2, . . . , 402-N in the step S202 of the method 200. In the step S206 of the method 200, the processor 102 may use the output of the algorithm 300 (i.e., the M IDs randomly selected in the step S304 of the algorithm 300) to request the M network nodes 402-1, 402-2, . . . , 402-M to transmit their local Q-tables obtained after a given run of the RL agents in the exploration mode and, in response, receive these local Q-tables (i.e., $Q_1$-table, $Q_2$-table, . . . , $Q_M$-table). Then, the processor 102 may obtain the common Q-table based on the local Q-tables in the step S208 of the method 200 and use the obtained common Q-table to check whether the termination criterion is met in the step S210 of the method 200. It is assumed that the termination criterion is not met, for which reason the processor 102 transmits the second indication to each of the network nodes 402-1, 402-2, . . . , 402-N in the step S212 of the method 200. Each of the network nodes 402-1, 402-2, . . . , 402-N may use the common Q-table to update its local Q-table, for example, by using the same functions as the ones discussed above with reference to the common set S* of parameters.

Figure 5:
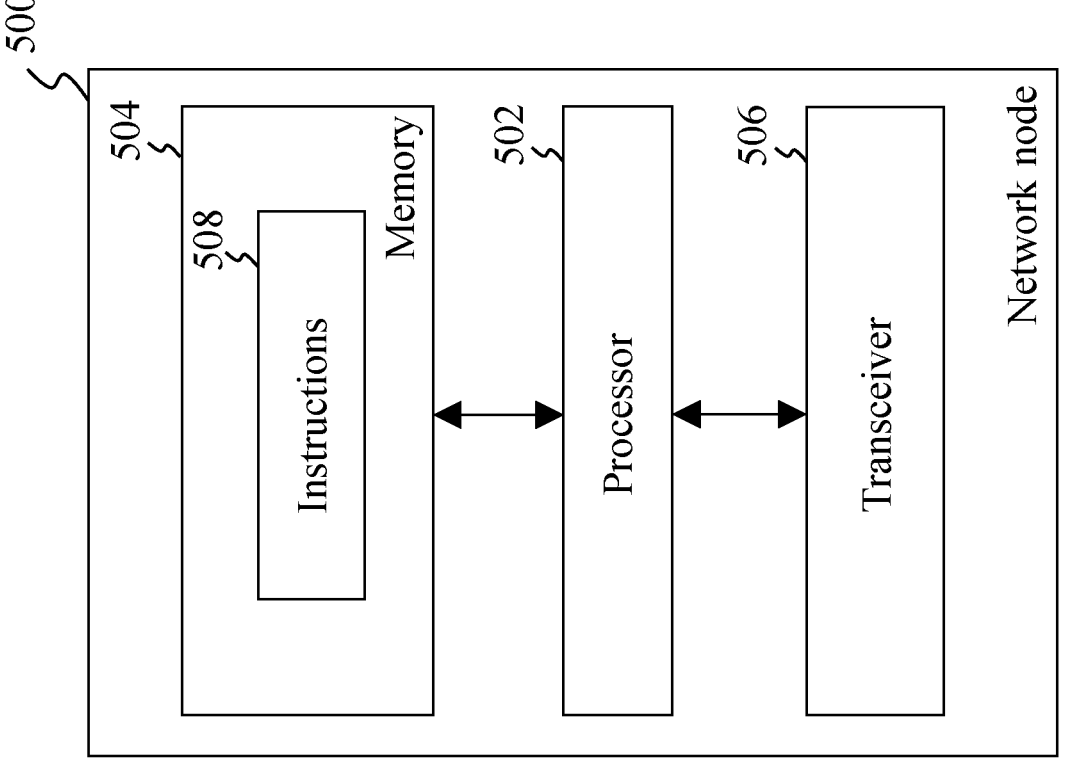
FIG. 5 shows a block diagram of a network node in accordance with one example embodiment.

FIG. 5 shows a block diagram of a network node 500 in accordance with one example embodiment. The network node 500 is intended to communicate with the ML orchestrator entity 100 in any of the above-described wireless communication networks. As shown in FIG. 5, the source network node 500 comprises a processor 502, a memory 504, and a transceiver 506. The memory 504 stores processor-executable instructions 508 which, when executed by the processor 502, cause the processor 502 to implement the aspects of the present disclosure, as will be described below in more detail. It should be again noted that the number, arrangement, and interconnection of the constructive elements constituting the network node 500, which are shown in FIG. 5, are not intended to be any limitation of the present disclosure, but merely used to provide a general idea of how the constructive elements may be implemented within the network node 500. In general, the processor 502, the memory 504, the transceiver 506, and the processor-executable instructions 508 may be implemented in the same or similar manner as the processor 102, the memory 104, the transceiver 106, and the processor-executable instructions 108, respectively.

FIG. 6 shows a flowchart of a method 600 for operating the network node 500 in accordance with one example embodiment. The method 600 starts with a step S602, in which the processor 502 receives (e.g., via the transceiver 506), from the ML orchestrator entity 100, the first indication to iteratively run an ML agent pre-installed on the network node in the training mode. As noted above, each run of the ML agent in the training mode yields a local set of parameters for the ML agent. Then, after each run of the ML agent in the training mode, the method 600 proceeds to a step S604, in which the processor 502 transmits (e.g., via the transceiver 506) the local set of parameters to the ML orchestrator entity 100. Again, this transmission may be performed via a ML agent-specific signaling interface. After that, the method 600 goes on to a step S606, in which the processor 502 receives (e.g., vie the transceiver 506) the second indication or the third indication from the ML orchestrator entity 100. The second indication causes the processor 502 to: (i) update the local set of parameters based on a common set of parameters (which is obtained as discussed above with reference to FIG. 2, i.e., by using the method 200), and (ii) use the updated local set of parameters in a subsequent run of the ML agent in the training mode. The third indication causes the processor 502 to: (i) terminate the training mode for the ML agent, and (ii) run the ML agent in an inference mode by using the common set of parameters (which is obtained after the last run of the ML agent). Each of the second indication and the third indication comprises the common set of parameters. Whether the processor 502 receives the second or third indication depends on whether the termination criterion for the training mode (which is checked in the ML orchestrator entity 100) is met or not.

Figure 7:
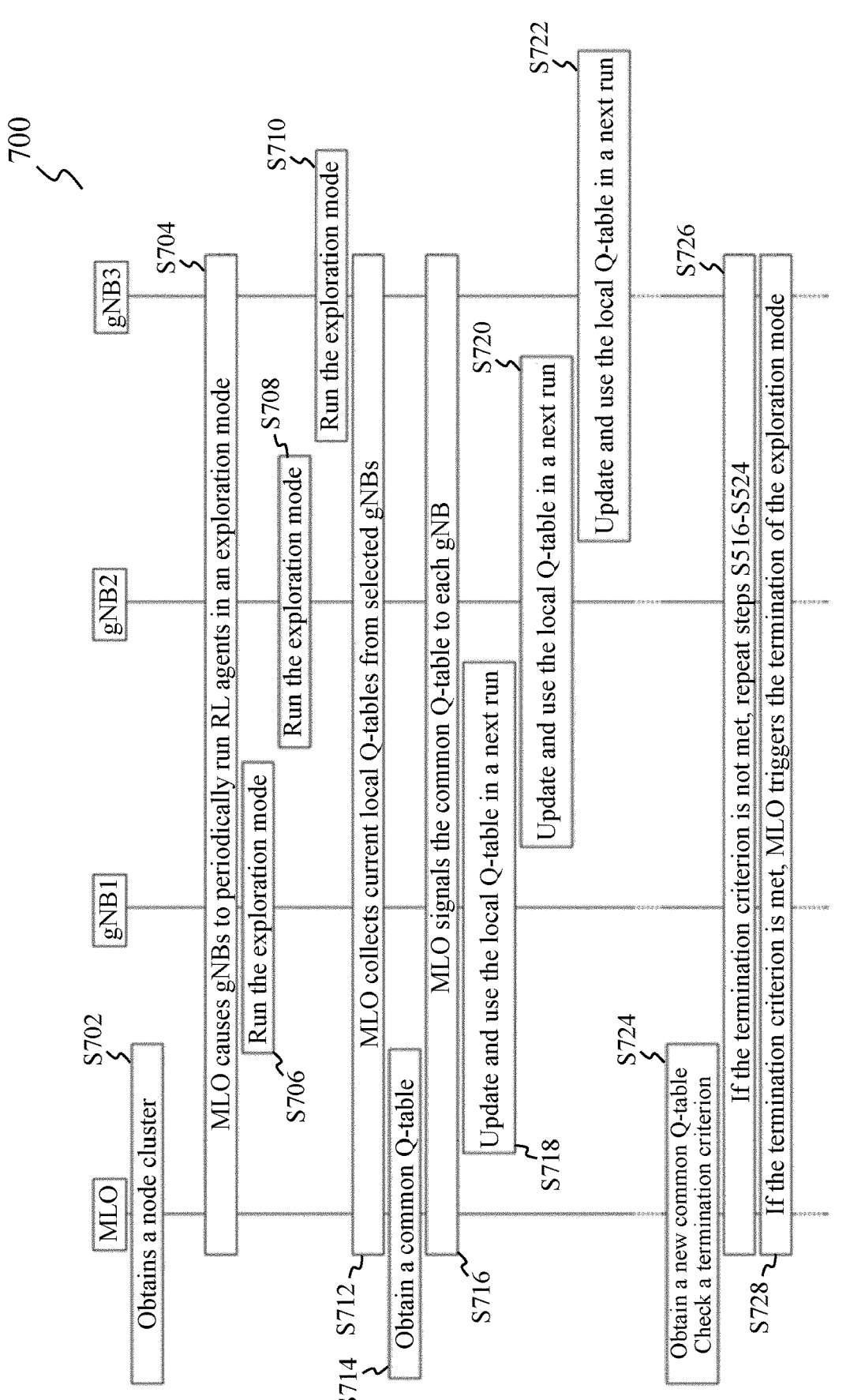
FIG. 7 shows an interaction diagram which explains the interaction between an ML orchestrator entity (like the ML orchestrator entity shown in FIG. 1) and three network nodes (each like the network node shown in FIG. 5) in a wireless communication network in accordance with one example embodiment.

FIG. 7 shows an interaction diagram 700 which explains the interaction between an ML orchestrator entity and three network nodes in a wireless communication network in accordance with one example embodiment. The ML orchestrator entity or MLO for short may be implemented as the ML orchestrator entity 100, and each of the three network nodes may be implemented as the network node 500. In FIG. 7, the three network nodes are assumed to be gNBs, meaning that the interaction diagram 700 is executed in a 5G communication network. The number of the network nodes shown in FIG. 7 is selected for simplicity only and should not be construed as any limitation of the present disclosure. The interaction diagram 700 starts with a step S702, in which the MLO obtains a single node cluster constituted by only three gNBs, i.e., gNB1, gNB2, and gNB3. Each of gNB1, gNB2, and gNB3 is assumed to have an RL agent installed thereon and using the Q-learning approach. The interaction diagram 700 then proceeds to a step S704, in which the MLO instructs each of gNB1, gNB2, and gNB3 to iteratively run their RL agents in the exploration mode. For this purpose, the MLO transmits a corresponding indication (e.g., the first indication used in the method 200) or trigger signal to each of gNB1, gNB2, and gNB3. Next, gNB1, gNB2, and gNB3 run their own RL agents in the exploration mode in steps S706-S710, respectively. It should be noted that the steps S706-S710 may be performed in parallel, for which reason the execution of the exploration mode in each of gNB1, gNB2 and gNB3 may be also initiated at the same time. After the first run is completed, the MLO collects, in a next step S712, a local Q-table from each of gNB1, gNB2, and gNB3 (in some other embodiments, the MLO may collect the local Q-tables from any two from the three gNBs). Further, the interaction diagram 700 goes to a step S714, in which the MLO obtains a common Q-table based on the collected local Q-tables. After that, the MLO instructs each of gNB1, gNB2, and gNB3 to update its own local Q-table based on the common Q-table. This may be done by sending the second indication used in the method 200. Next, gNB1, gNB2, and gNB3 update their local Q-tables based on the common Q-table and use the updated local Q-tables in steps S718-S722, respectively. Then, the interaction diagram 700 proceeds to a step S724, in which, after a second run, the MLO again collects the local Q-tables from gNB1, gNB2, and gNB3 to obtain a new common Q-table. At the same time, in the step S724, the MLO checks whether a termination criterion for the exploration mode is met. In this embodiment, the termination criterion is defined as follows: Mean(Common_set(t)−Common_set(t−1))≤ε. If the termination criterion is not met, the MLO decides, in a step S726, to repeat the steps S716-S724. However, if the termination criterion is met, the MLO decides, in a step S728, to trigger the termination of the exploration mode in each of gNB1, gNB2, and gNB3. Afterwards, the MLO may also transmit the third indication used in the method 200 to each of gNB1, gNB2, and gNB3.

It should be noted that each step or operation of the methods 200 and 600, the algorithm 300 and the interaction diagram 700, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processor 102 or 502, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A machine-learning (ML) orchestrator entity in a wireless communication network, said ML orchestrator entity comprising:

at least one processor; and at least one memory including computer program code;

wherein the at least one memory and the computer program code are configured to, with the at least one processor, cause the ML orchestrator entity to:

group a set of network nodes in the wireless communication network into at least one node cluster based on at least one radio condition of a set of cells served by the set of network nodes, each network node from the set of network nodes having an ML agent installed thereon, the ML agent being configured to run based on a radio measurement in a training mode and in an inference mode; and for each node cluster from the at least one node cluster:

transmit, to each network node of the node cluster, a first indication to iteratively run the ML agent in the training mode, each run of the ML agent in the training mode yielding a local set of parameters for the ML agent; and after each run of the ML agents in the training mode:

receive at least two local sets of parameters from at least two network nodes of the node cluster;

based on the at least two local sets of parameters, obtain a common set of parameters;

based on the common set of parameters, check whether a termination criterion for the training mode is met; and if the termination criterion for the training mode is not met, transmit, to each network node of the node cluster, a second indication to: (i) update the local set of parameters based on the common set of parameters, and (ii) use the updated local set of parameters in a subsequent run of the ML agent in the training mode, the second indication comprising the common set of parameters.

2. The ML orchestrator entity of claim 1, wherein the at least one memory and the computer program code are configured to, with the at least one processor, cause the ML orchestrator entity to receive each of the at least two local sets of parameters via an ML agent-specific signalling interface.

3. The ML orchestrator entity of claim 1, wherein the at least one memory and the computer program code are further configured to, with the at least one processor, cause the ML orchestrator entity to:

after each run of the ML agents in the training mode, transmit a request for the local set of parameters to each of the at least two network nodes of the node cluster; and in response to the request, receive the at least two local sets of parameters.

4. The ML orchestrator of claim 3, wherein the at least one memory and the computer program code are further configured to, with the at least one processor, cause the ML orchestrator entity, before transmitting the request, to randomly select the at least two network nodes among the node cluster.

5. The ML orchestrator entity of claim 1, wherein the at least one memory and the computer program code are further configured to, with the at least one processor, cause the ML orchestrator entity to:

after each run of the ML agents in the training mode, receive a request for the common set of parameters from each network node of the node cluster; and in response to the request, transmit the second indication to each network node of the node cluster.

6. The ML orchestrator entity of claim 1, wherein the at least one memory and the computer program code are further configured to, with the at least one processor, cause the ML orchestrator entity to transmit, together with the second indication, a time instant from which the common set of parameters is to be used for updating the local set of parameters at each network node of the node cluster before the subsequent run of the ML agents is initiated.

7. The ML orchestrator entity of claim 1, wherein the at least one memory and the computer program code are further configured to, with the at least one processor, cause the ML orchestrator entity to:

if the termination criterion for the training mode is met, transmit, to each network node of the node cluster, a third indication to: (i) terminate the training mode for the ML agent, and (ii) run the ML agent in the inference mode by using the common set of parameters, the third indication comprising the common set of parameters.

8. The ML orchestrator entity of claim 7, wherein the at least one memory and the computer program code are further configured to, with the at least one processor, cause the ML orchestrator entity to transmit, together with the third indication, a time instant from which the common set of parameters is to be used in the inference mode of the ML agent at each network node of the node cluster.

9. The ML orchestrator entity of claim 1, wherein the at least one memory and the computer program code are configured to, with the at least one processor, cause the ML orchestrator entity to obtain the common set of parameters by using at least one of a linear function, a non-linear function, and a Boolean function.

10. The ML orchestrator entity of claim 1, wherein the ML agent comprises a reinforcement learning (RL) agent configured to run in an exploration mode as the training mode and in an exploitation mode as the inference mode.

11. The ML orchestrator entity of claim 10, wherein the RL agent is based on a Q-learning approach, and each of the at least two local sets of parameters from the at least two network nodes of the node cluster is presented as a local Q-table, and wherein the at least one memory and the computer program code are configured to, with the at least one processor, cause the ML orchestrator entity to obtain the common set of parameters as a common Q-table.

12. The ML orchestrator entity of claim 1, wherein the termination criterion for the training mode is defined as:

a similarity metric calculated based on two or more common sets of parameters obtained after two or more consecutive runs of the ML agents of the at least two network nodes in the training mode is less than or equal to a threshold.

13. A network node in a wireless communication network, said network node comprising:

at least one processor; and at least one memory including computer program code;

wherein the at least one memory and the computer program code are configured to, with the at least one processor, cause the network node to:

receive, from a machine-learning (ML) orchestrator entity, a first indication to iteratively run an ML agent installed on the network node in a training mode, each run of the ML agent in the training mode yielding a local set of parameters for the ML agent; and after each run of the ML agent in the training mode:

transmit the local set of parameters to the ML orchestrator entity; and receive, from the ML orchestrator entity, a second indication to: (i) update the local set of parameters based on a common set of parameters, and (ii) use the updated local set of parameters in a subsequent run of the ML agent in the training mode; or a third indication to: (i) terminate the training mode for the ML agent, and (ii) run the ML agent in an inference mode by using the common set of parameters, wherein each of the second indication and the third indication comprises the common set of parameters, and the common set of parameters is obtained based on the local set of parameters of the network node and at least one other local set of parameters of at least one other network node.

14. The network node of claim 13, wherein the at least one memory and the computer program code are configured to, with the at least one processor, cause the network node to transmit the local set of parameters via an ML agent-specific signalling interface.

15. The network node of claim 13- or 14, wherein the at least one memory and the computer program code are further configured to, with the at least one processor, cause the ML orchestrator entity to:

after each run of the ML agent in the training mode, receive a request for the local set of parameters from the ML orchestrator entity; and in response to the request, transmit the local set of parameters to the ML orchestrator entity.

16. The network node of claim 13, wherein the at least one memory and the computer program code are further configured to, with the at least one processor, cause the ML orchestrator entity to:

after each run of the ML agent in the training mode, transmit a request for the common set of parameters to the ML orchestrator entity; and in response to the request, receive the second indication or the third indication from the ML orchestrator entity.

17. The network node of claim 13, wherein the at least one memory and the computer program code are further configured to, with the at least one processor, cause the network node to receive, together with the second indication, a time instant from which the common set of parameters is to be used for updating the local set of parameters at the network node before the subsequent run of the ML agent is initiated.

18. The network node of claim 13, wherein the at least one memory and the computer program code are further configured to, with the at least one processor, cause the network node to receive, together with the third indication, a time instant from which the common set of parameters is to be used in the inference mode of the ML agent at the network node.

19. The network node of claim 13, wherein the ML agent comprises a reinforcement learning (RL) agent configured to run in an exploration mode as the training mode and in an exploitation mode as the inference mode.

20. The network node of claim 19, wherein the RL agent is based on a Q-learning approach, and the at least one memory and the computer program code are configured to, with the at least one processor, cause the network node to present the local set of parameters as a local Q-table, and wherein the common set of parameters is presented as a common Q-table.

21. A method for operating a machine-learning (ML) orchestrator entity in a wireless communication network, said method comprising:

grouping a set of network nodes in the wireless communication network into at least one node cluster based on at least one radio condition of a set of cells served by the set of network nodes, each network node from the set of network nodes having an ML agent installed thereon, the ML agent being configured to run based on a radio measurement in a training mode and in an inference mode; and for each node cluster from the at least one node cluster:

transmitting, to each network node of the node cluster, a first indication to iteratively run the ML agent in the training mode, each run of the ML agent in the training mode yielding a local set of parameters for the ML agent; and after each run of the ML agents in the training mode:

receiving at least two local sets of parameters from at least two network nodes of the node cluster;

based on the at least two local sets of parameters, obtaining a common set of parameters;

based on the common set of parameters, checking whether a termination criterion for the training mode is met; and if the termination criterion for the training mode is not met, transmitting, to each network node of the node cluster, a second indication to: (i) update the local set of parameters based on the common set of parameters, and (ii) use the updated local set of parameters in a subsequent run of the ML agent in the training mode, the second indication comprising the common set of parameters.

22. A method for operating a network node in a wireless communication network, said method comprising:

receiving, from a machine-learning (ML) orchestrator entity, a first indication to iteratively run an ML agent installed on the network node in a training mode, each run of the ML agent in the training mode yielding a local set of parameters for the ML agent; and after each run of the ML agent in the training mode:

transmitting the local set of parameters to the ML orchestrator entity; and receiving, from the ML orchestrator entity, a second indication to: (i) update the local set of parameters based on a common set of parameters, and (ii) use the updated local set of parameters in a subsequent run of the ML agent in the training mode; or a third indication to: (i) terminate the training mode for the ML agent, and (ii) run the ML agent in an inference mode by using the common set of parameters, wherein each of the second indication and the third indication comprises the common set of parameters, and the common set of parameters is obtained based on the local set of parameters of the network node and at least one other local set of parameters of at least one other network node.

23. A non-transitory computer-readable storage medium, wherein the computer-readable storage medium stores computer code thereon which, when executed by at least one processor, causes the at least one processor to perform the method according to claim 21.

24. A non-transitory computer-readable storage medium, wherein the computer-readable storage medium stores computer code thereon which, when executed by at least one processor, causes the at least one processor to perform the method according to claim 22.

\* \* \* \* \*